United States Patent
Li

(10) Patent No.: US 11,510,046 B2
(45) Date of Patent: Nov. 22, 2022

(54) DATA REPORTING METHOD FOR LOGISTICS DEVICE AND SYSTEM THEREFOR

(71) Applicant: SHANGHAI HONGYAN RETURNABLE TRANSIT PACKAGINGS CO., LTD., Shanghai (CN)

(72) Inventor: Bo Li, Shanghai (CN)

(73) Assignee: SHANGHAI HONGYAN RETURNABLE TRANSIT PACKAGINGS CO., LTD., Shanghai (CN)

(*) Notice: Subject to any disclaimer, the term of this patent is extended or adjusted under 35 U.S.C. 154(b) by 0 days.

(21) Appl. No.: 17/424,859

(22) PCT Filed: Jan. 20, 2020

(86) PCT No.: PCT/CN2020/073291
§ 371 (c)(1),
(2) Date: Jul. 21, 2021

(87) PCT Pub. No.: WO2020/151674
PCT Pub. Date: Jul. 30, 2020

(65) Prior Publication Data
US 2022/0095090 A1    Mar. 24, 2022

(30) Foreign Application Priority Data

Jan. 21, 2019  (CN) .......................... 201910054444.6

(51) Int. Cl.
H04B 7/00 (2006.01)
H04W 8/00 (2009.01)
(Continued)

(52) U.S. Cl.
CPC ............. *H04W 8/005* (2013.01); *H04L 67/12* (2013.01); *H04L 67/60* (2022.05); *H04W 4/80* (2018.02);
(Continued)

(58) Field of Classification Search
CPC ... H04W 8/005; H04W 4/80; H04W 52/0229; H04L 67/12; H04L 67/32; G06Q 50/28
(Continued)

(56) References Cited

U.S. PATENT DOCUMENTS 8,502,671 B2 * 8/2013 Marcovici .............. B65D 83/04
340/572.8
2006/0218651 A1 * 9/2006 Ginter ................ H04N 21/2547
375/E7.009
(Continued)

FOREIGN PATENT DOCUMENTS

CN 102413536 A 4/2012
CN 102761941 A 10/2012
(Continued)

OTHER PUBLICATIONS

International Search Report (with English translation) and Written Opinion issued in PCT/CN2020/073291, dated Apr. 20, 2020, 10 pages provided.

*Primary Examiner* — April G Gonzales
(74) *Attorney, Agent, or Firm* — Hamre, Schumann, Mueller & Larson, P.C.

(57) ABSTRACT

This application relates to the field of logistics, and discloses a data reporting method and system for logistics containers. Each logistics container is provided with a terminal, and the terminal includes a first communication module and a second communication module. The server sends a first message to the second communication module of the first terminal; when the second terminal communicates with the (Continued)

server through its second communication module, it reports the identification of other surrounding terminals detected by the second terminal through its first communication module to the server; if the server detects that the reported identifier includes the identifier of the first terminal, it sends a second message to the second terminal; In response to the second message, the second terminal wakes up the second communication module of the first terminal through its first communication module; The first terminal communicates with the server through its second communication module, and receives the first message. This application can realize the timely and on-demand reporting of data to the server by the logistics container under the condition of low power consumption, which reduces the labor cost and material cost of the management of the logistics container.

10 Claims, 3 Drawing Sheets

(51) Int. Cl.
| | |
|---|---|
| *H04W 4/80* | (2018.01) |
| *H04L 67/12* | (2022.01) |
| *H04W 52/02* | (2009.01) |
| *H04L 67/60* | (2022.01) |
| *G06Q 50/28* | (2012.01) |

(52) U.S. Cl.
CPC ........ *H04W 52/0229* (2013.01); *G06Q 50/28* (2013.01)

(58) Field of Classification Search
USPC ......................................................... 455/41.1
See application file for complete search history.

(56) References Cited

U.S. PATENT DOCUMENTS

| | | | | |
|---|---|---|---|---|
| 2007/0276759 | A1* | 11/2007 | Ginter ................ | G11B 20/0071 705/53 |
| 2008/0120240 | A1* | 5/2008 | Ginter .................. | G06Q 20/085 705/51 |
| 2015/0057560 | A1* | 2/2015 | Behan .................. | A61B 5/4812 600/595 |
| 2018/0041501 | A1* | 2/2018 | Liao ........................ | G06F 21/44 |
| 2018/0102795 | A1* | 4/2018 | Liao ....................... | H04B 1/034 |
| 2018/0183905 | A1* | 6/2018 | Azizi ...................... | H04L 27/02 |
| 2020/0118065 | A1* | 4/2020 | Li ........................... | H04W 4/80 |
| 2022/0095090 | A1* | 3/2022 | Li ...................... | H04W 52/0219 |
| 2022/0095234 | A1* | 3/2022 | Li ....................... | H04W 52/028 |

FOREIGN PATENT DOCUMENTS

| | | |
|---|---|---|
| CN | 104968037 A | 10/2015 |
| CN | 206773751 U | 12/2017 |
| CN | 109548125 A | 3/2019 |
| EP | 3051885 A1 | 8/2016 |

\* cited by examiner

DATA REPORTING METHOD FOR LOGISTICS DEVICE AND SYSTEM THEREFOR

TECHNICAL FIELD

The application relates to the field of logistics, in particular to a data reporting technology for logistics containers.

BACKGROUND

The intelligent recyclable logistics container includes a wireless terminal, which can access the mobile wireless communication system, such as 3G, 4G, 5g communication system, and send the identification and status information of the logistics container to the server. However, in order to maintain the connection with the mobile wireless communication system, it needs to consume more power, and cannot achieve real-time or long-time standby. One solution is to increase the sleeping time of the wireless terminal in the recyclable logistics container, and connect with the server only at the preset time. But this solution will make the server unable to communicate with the recyclable logistics container in time, or the recyclable logistics container cannot report data to the server in time and on demand. If you increase the sleep time, you will lose the timeliness of communication. If you want to ensure the timeliness of communication, you will greatly shorten the standby time of the wireless terminal. How to not only be able to wait for a long time, but also enable the recyclable logistics container to report data to the server in time and on demand has become an urgent problem in this field.

SUMMARY

The purpose of this application is to provide a data reporting method for logistics containers and a system thereof, which can timely and on-demand report data to the server under the condition of low power consumption, and reduce the labor cost and material cost of logistics container management.

In order to solve the above problem, the application discloses a data reporting method of logistics container, wherein each logistics container comprising a terminal, each terminal comprising a first communication module and a second communication module, and the communication distance of the second communication module is greater than the communication distance of the first communication module, the method comprising:

Caching the first message if the second communication module of the first terminal being in sleeping state when a server sending the first message to the second communication module of the first terminal;

Reporting the identifications of other surrounding terminals detected by the second terminal through its first communication module to the server when the second terminal communicating with the server through its second communication module;

Sending a second message to the second terminal if the server detecting that the identification of the first terminal is included in the identifications of other surrounding terminals reported by the second terminal;

In response to the second message, the second terminal waking up the second communication module of the first terminal through the first communication module of the second terminal;

The first terminal communicating with the server through the second communication module of the first terminal to receive the first message.

In a preferred example, the second terminal waking up the second communication module of the first terminal through the first communication module of the second terminal, further comprising:

The second terminal transmitting a preset identification code at a preset frequency point through the first communication module of the second terminal;

The first terminal detecting the energy value of the wireless signal at the preset frequency point, and if the detected energy value exceeding a preset threshold, waking up a second unit of the first terminal in sleep, and the second unit receiving the wireless signal within a preset time period and detecting whether the preset identification code exists in the received wireless signal, and waking up the second communication module of the first terminal if the preset identification code is detected.

In a preferred example, the first communication module is a Sub-1 GHz module, a Bluetooth module, a ZigBee module, or a WIFI module;

The second communication module is a module based on a mobile communication network In a preferred example, the identification code of the contract is:

A unique identification of the terminal, in which the unique identification of different terminals is different;

Or, an identification of the user to which the terminal belongs, in which each user owns one or more terminals.

In a preferred example, the terminal is installed in the recyclable logistics container, and the terminal also includes one or more sensors for detecting the status of the recyclable logistics container.

In a preferred example, the sensor includes one or any combination of the following: a temperature sensor, a humidity sensor, an acceleration sensor, a gyroscope, a satellite positioning device, and a switching device.

The application also discloses a data reporting system for logistics containers, wherein each logistics container comprising a terminal, each terminal comprising a first communication module and a second communication module, and the communication distance of the second communication module is greater than that of the first communication module; The system comprising a first terminal, a second terminal and a server, wherein:

The server configured to cache the first message if the second communication module of the first terminal is in sleeping state when the server sending the first message to the second communication module of the first terminal, and send the second message to the second terminal if it is detected that the identification of the first terminal is included in the identifications of other surrounding terminals reported by the second terminal;

The first terminal configured to communicate with the server through the second communication module of the terminal to receive the first message;

The second terminal configured to report the identifications of other surrounding terminals detected by the second terminal through the first communication module of the second terminal to the server when communicating with the server through the second communication module of the second terminal, and responding to the second message, the second terminal waking up the second communication module of the first terminal through the first communication module of the second terminal.

In a preferred example, the second terminal is also configured to transmit the preset identification code at the preset frequency point through the first communication module of the second terminal;

The first terminal is also configured to detect the energy value of the wireless signal at the preset frequency point, and wake up the second unit of the first terminal if the detected energy value exceeding a preset threshold, and the second unit is configured to receive the wireless signal within a preset period of time and detect whether the preset identification code exists in the received wireless signal, and wakeup the second communication module of the first terminal if the preset identification code is detected.

In a preferred example, the first communication module is a Sub-1 GHz module, a Bluetooth module, a ZigBee module, or a WIFI module;

The second communication module is a module based on a mobile communication network.

In a preferred example, the identification code of the contract is:

A unique identification of the terminal, in which the unique identification of different terminals is different;

Or, an identification of the user to which the terminal belongs, in which each user owns one or more terminals.

Compared with the prior art, the embodiment of the present application at least includes the following advantages:

Each logistics container is provided with at least one terminal, which has a low-power wake-up function, specifically as follows: the second unit of the terminal is usually in sleeping state, and the second unit is waked up when the first unit detects that the energy value of the wireless signal at the preset frequency exceeds a preset threshold. The second unit determines whether to wake up other units in the terminal (such as remote communication module, various sensors, microprocessors, etc.) by further detecting the identification code in the wireless signal, which realizes timely and accurate wake-up on the premise of minimizing power consumption. Because most of the units in the terminal may always be in the sleeping state, the power consumption is minimized. The first unit of the same terminal can wake up the second unit in time to ensure the timeliness of communication. The detection of the identification code in the second unit ensures the accuracy of wake-up, and reduce the possibility of increased power consumption due to false awakening by interference signals.

Setting both a short-range first communication module and a remote second communication module in the terminal, setting the first unit and the second unit in the first communication module, the first unit of the first communication module detecting the energy value of the wireless signal at a preset frequency, and waking up the second unit to detect the identification code in the wireless signal when the energy value exceeding the preset threshold, only after the preset identification code is detected, the second communication module is waked up to realize remote communication with the server. This communication mode makes the power consumption of the second communication module, which consumes more power, stay in sleeping state as much as possible, thereby greatly reducing the power consumption of the entire terminal. And because the first unit of short-range communication is always in the detection state, it is guaranteed that the second communication module can be waked up in time when the server needs to communication. Because logistics containers are usually in a stacked centralized storage state, as long as one logistics container in a pile of logistics containers can communicate with the server, it can wake up nearby logistics containers through the first communication module of the logistics container when necessary.

Each logistics container is provided with at least one terminal, and then each logistics container forms a wireless communication network system with the server through the first communication module and the second communication module of each terminal, so that each terminal can carry out effective low-power communication (such as executing wake-up process) in the network, and the low-power communication prolongs the service time of the internal battery of the logistics container, It can even realize that there is no need to replace the battery or charge the logistics container in a very long time (such as 5 years) while ensuring the effective communication between each terminal and the server, it also saves the labor cost and material cost in the process of asset management, and achieves the beneficial effect of energy conservation and environmental protection.

Each logistics container is provided with at least one terminal, then each logistics container forms a wireless communication network system with the server through the first communication module and the second communication module of each terminal, and the server may specify or require a terminal to report data to it, further realizing that: in the wireless communication network system, the server sends a message to the target terminal (the terminal that needs to report data). If the second communication module of the target terminal is in sleeping state, the server wakes up the target terminal by sending the second message to other terminals around the target terminal. After the target terminal is waked up, it may communicate with the server to report data to the server, it achieves the beneficial effect that each terminal can report data to the server in time and on demand.

A large number of technical features are recorded in the description of the application, which are distributed in various technical solutions. If all possible combinations of technical features (i.e., technical solutions) of the application are to be listed, the description will be too lengthy. In order to avoid this problem, the technical features disclosed in the above invention content, the technical features disclosed in the following embodiments and examples, and the technical features disclosed in the drawings may be freely combined with each other to form various new technical solutions (these technical solutions are considered to have been recorded in the description), Unless this combination of technical features is technically infeasible. For example, feature A+B+C is disclosed in one example, and feature A+B+D+E is disclosed in another example. Feature C and D are equivalent technical means that play the same role. Technically, only one can be used at the same time, and feature E can be combined with feature C. then, the scheme of A+B+C+D should not be regarded as recorded because it is technically infeasible, the scheme of A+B+C+E should be regarded as recorded.

DETAILED DESCRIPTION

Figure 1:
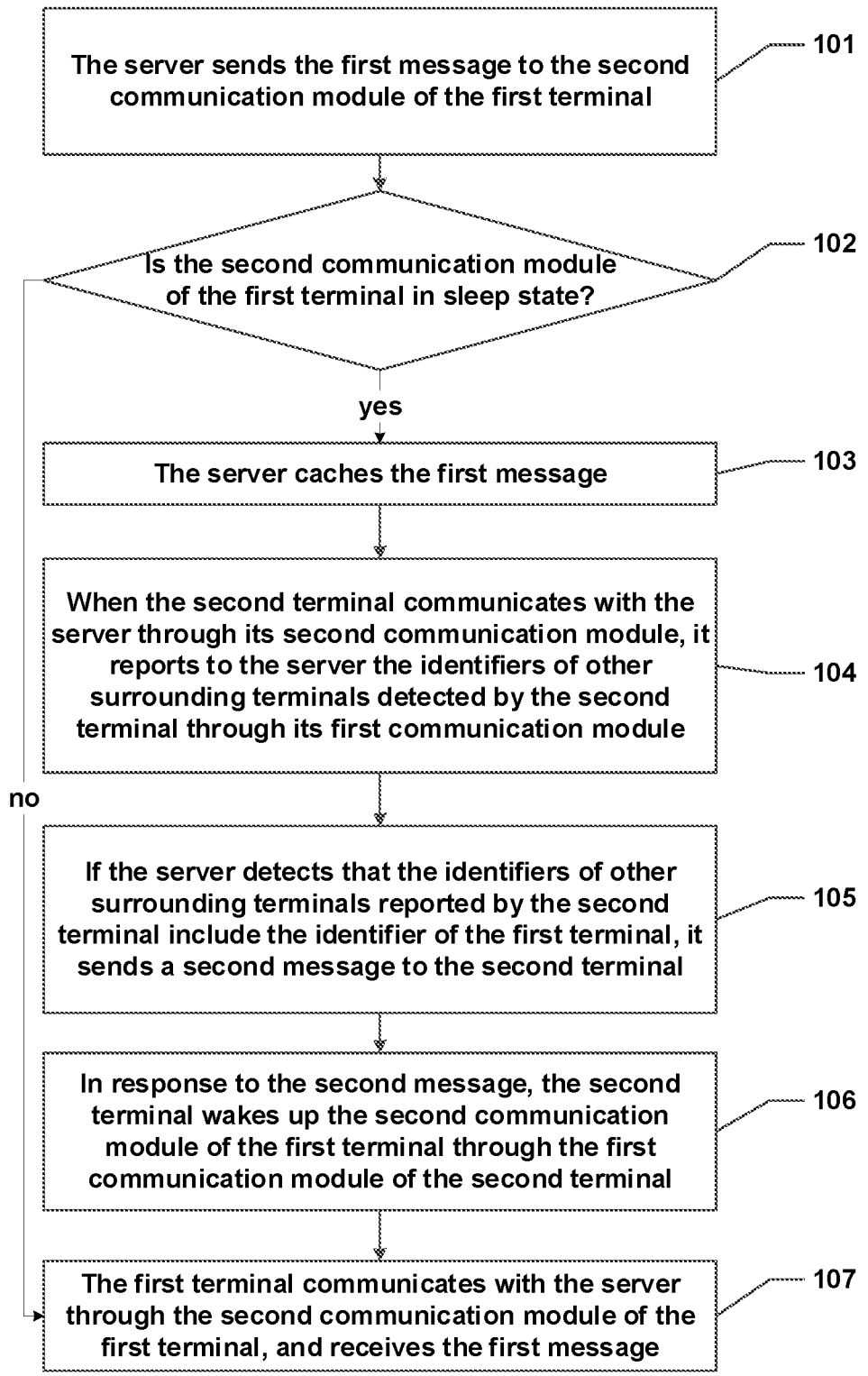
FIG. 1 is a flow diagram of a data reporting method for a logistics container according to the first embodiment of the present application

In the following description, many technical details are proposed in order to make the reader better understand the application. However, it can be understood by those skilled in the art that the technical solution claimed in the present application can be realized even without these technical details and various changes and modifications based on the following embodiments.

Explanation of Some Concepts:

RFID, Abbreviation for Radio Frequency Identification.??? (没有中文原文)

ZigBee: The Chinese name is Purple Bee Protocol.

Sub-1G: Wireless communication generally below 1 GHz band, such as 315 MHz, 433 MHz, 868 MHz, 915 MHz, etc. Generally, refers to Sub-1 GHz.

Some invention points of the embodiment of the present application are briefly introduced as follows:

In order to save power, the remote communication module which may directly communicate with the server in the logistics container is usually in the sleeping state and contacts with the server periodically (for example, waking up the remote communication module at a specified time every day and synchronizing with the server once). When the server needs to communicate with the logistics container due to unexpected reasons (for example, the server suddenly wants to know the current location and status of the logistics container), it can only wait for the next opportunity to synchronize, and the timeliness is out of the question.

An innovation of the implementation mode of the application is that when the server needs to communicate with a logistics container (which may be called the first logistics container), if it is found that the remote communication module of the logistics container is just in the sleeping state, it does not give up this communication, but temporarily cache the communication request. Each logistics container has a short-range communication module (i.e., the first communication module) and a remote communication module (i.e., the second communication module). The short-range communication module may communicate with the short-range communication module of other nearby logistics containers, and may sense the existence of the short-range communication module of other logistics containers. When a logistics container (which may be called the second logistics container) is triggered for some reason (for example, the preset synchronization time has arrived, or the logistics container has an event requiring alarm) and communicates with the server through the remote communication module, it will report the information of other nearby logistics containers perceived by it through the short-range communication module. The server will look up the cached communication request. If it is found that the reported information of other logistics containers includes the first logistics container, that is, the logistics container that the server wants to communicate with before is just near the current communication second logistics container, it will send instructions to the second logistics container. Let the second logistics container wake up the first logistics container to be communicated through the short-range communication module, so that the logistics container to be communicated may be wakened as soon as possible without long waiting. Logistics containers are often stacked in a large number. For example, in the warehouse, many logistics containers will be stacked together intensively. These logistics containers are often close to each other and may be perceived by the short-range communication module. Therefore, this scheme of wake-up through nearby logistics containers is in line with the actual application scenario.

In order to make the object, technical solution and advantages of the application clearer, the implementation mode of the application will be further described in detail in combination with the drawings.

The first embodiment of the application relates to a data reporting method of a logistics container. Each logistics container is provided with a terminal, which comprises a first communication module and a second communication module. The communication distance of the second communication module is greater than that of the first communication module. The process is shown in FIG. 1. The method includes the following steps:

Step 101: The server sends the first message to the second communication module of the first terminal.

Step 102: The server determines whether the second communication module of the first terminal is in the sleeping state. If the second communication module of the first terminal is not in the sleeping state (i.e., in the wake-up state), go to step 107; Otherwise, go to step 103, the server caches the first message.

Step 104: When the second terminal communicates with the server through the second communication module of the second terminal, the second terminal reports the identifications of other surrounding terminals detected by the second terminal through the first communication module of the second terminal.

Step 105: If the server detects that the identification of the first terminal is included in the identifications of other surrounding terminals reported by the second terminal, the server sends a second message to the second terminal.

Step 106: In response to the second message, the second terminal wakes up the second communication module of the first terminal through the first communication module of the second terminal.

Step 107: The first terminal communicates with the server through the second communication module of the first terminal to receive the first message.

In the above steps 101-107, the server requires the first terminal to report data. When the second communication module of the first terminal is in the sleeping state, the server establishes communication with the second terminal nearby the first terminal by receiving other surrounding terminal identifications reported by each terminal and sending (alternatively periodically sending) the second message, then, the second terminal wakes up the second communication module of the first terminal in response to the second message, and the first terminal establishes communication with the server through the second communication module of the first terminal, so as to report the data of the first terminal.

Because the logistics containers are usually in the state of stacking and centralized storage, as long as one of the logistics containers can communicate with the server through its terminal, the terminal of the target logistics container can be waked up through the terminal of the logistics container, and then the communication between the terminal of the target Logistics container and the server can be realized, that is to complete the data reporting work.

Figure 4:
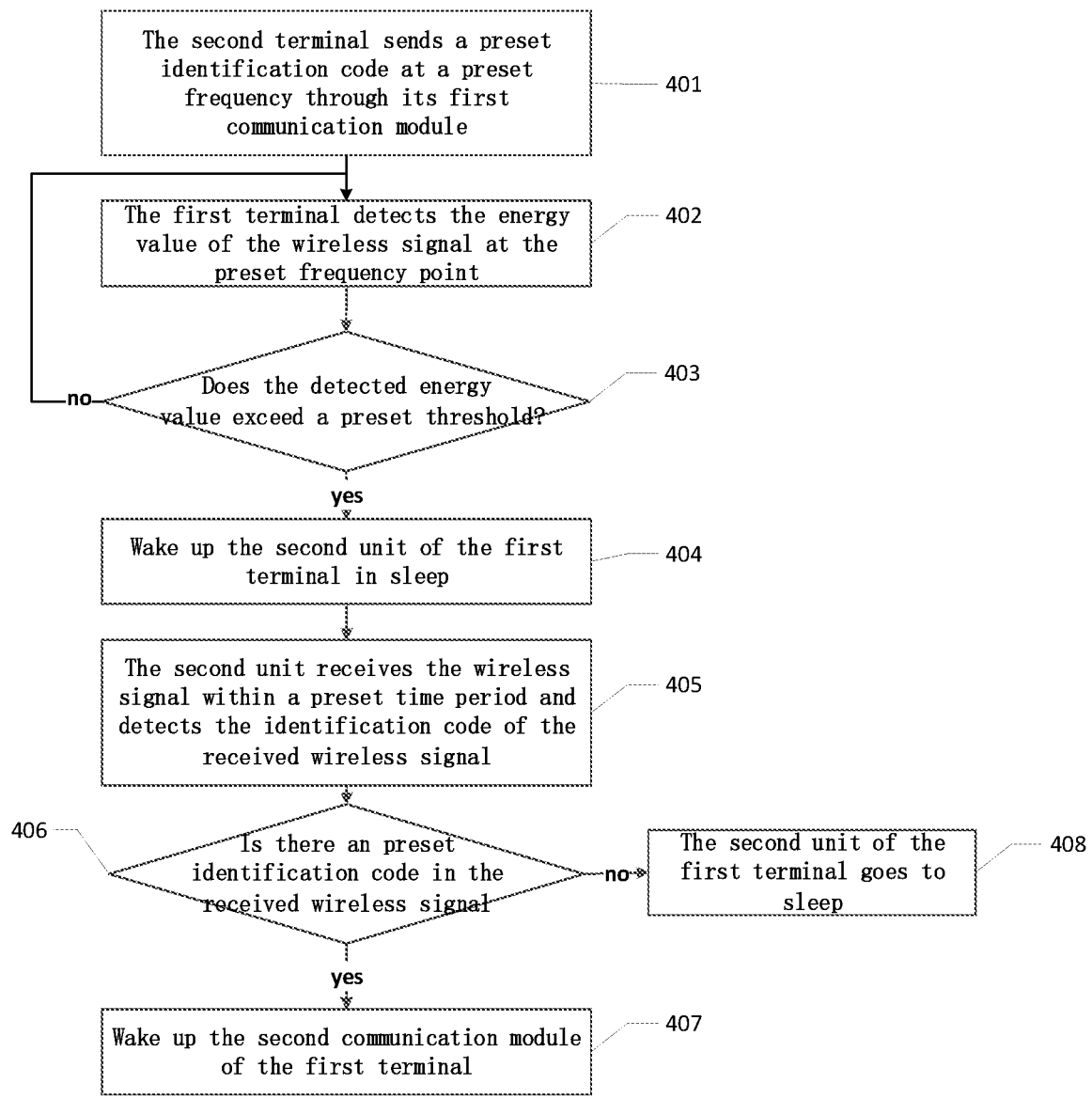
FIG. 4 is an embodiment of step 106 according to the first embodiment of the present application.

The flow chart of FIG. 4 is an embodiment of the above step 106, which further includes "steps 401-408". The embodiment is as follows: starting to execute step 401, the second terminal sends the preset identification code at the preset frequency point through the first communication module of the second terminal. Then, step 402 is executed: the first terminal detects the energy value of the wireless signal at the preset frequency point. Then, step 403 is executed to determine whether the detected energy value exceeds the preset threshold value, if it exceeds the preset threshold, the second unit of the first terminal remains in sleeping state and returns to step 402 to continue the detection. Otherwise, step 404 is executed to wake up the second unit of the first terminal in sleep. Then, step 405 is executed, and the second unit receives the wireless signal within a preset time period and detects the identification code in the received wireless signal. Then, step 406 is executed to determine whether a conventional identification code exists in the received wireless signal. If the preset identification code exists, step 407 is executed to wake up the second communication module of the first terminal; otherwise, step 408 is executed, the second unit of the first terminal enters the sleeping state, and the second communication module of the first terminal remains in the sleeping state.

Alternatively, the detection of the above step 402 can be carried out periodically, but the period is generally short enough to ensure the timeliness of communication, that is, the whole terminal can be waked up in time when necessary.

The preset threshold involved in the above steps 401-408 can be set according to the situation. Alternatively, the preset threshold is set to −85 dB. Specifically, the preset threshold determines the wake-up range of the second unit. In order to save power consumption and the control of the radio management department, the transmission power cannot be increased infinitely. For example, it is generally defined as 17 dB in China. Considering the attenuation of wireless signal transmission (generally, it will be attenuated to −95 dB after transmission of 1000 m in the visible distance) and other environmental factors, the transmission power cannot be increased infinitely, the preset threshold is set to a value higher than −95 dB, such as −85 dB, −80 dB and so on.

The size of the preset time period involved in the above steps 401-408 can be set according to the situation. Alternatively, the preset time period can be 100 ms. Alternatively, the preset time period may be 90 ms, etc.

The preset frequency point involved in the above steps 401-408 is set according to the type of the first communication module. For example, if the first communication module is a Sub-1 GHz module, the preset frequency point can be 315 MHz, 433 MHz, 868 mhz or 915 MHz.

The setting methods of the identification code involved in the above steps 401-408 are various. Alternatively, it can be set as the unique identification of the terminal, in which the unique identification of different terminals is different. Alternatively, it is set as the identification of the user to which the terminal belongs, in which each user owns one or more terminals.

The identification code involved in the above steps 401-408 may be, but is not limited to, a wireless LAN identification code. In one embodiment, the identification code is the WLAN identification code, and the nearby terminal will judge the identification code within 100 ms after being awakened. If it is the preset WLAN identification code, the terminal will continue to work and receive subsequent data, otherwise it is considered as interference signal, and the terminal will no longer carry out subsequent work and turn to sleeping state.

Alternatively, the first communication module involved in this specification is a micro power wireless communication module, and the first communication module is preferably a wireless communication module with the characteristics of strong penetration ability and low power consumption.

There are various types of the first communication module involved in this specification. Alternatively, the first communication module is a Sub-1 GHz module. Alternatively, the first communication module is a Bluetooth module. Alternatively, the first communication module is a ZigBee module. Alternatively, the first communication module is a WWI module.

Alternatively, the first communication module further comprises a first unit and a second unit. The first unit detects the energy value of the wireless signal at the preset frequency point, and wakes up the second unit of the first communication module in sleep if the detected energy value exceeds the preset threshold.

The second communication module involved in this description is a remote communication module (usually the communication distance is far greater than the first communication module), which is used for data transmission and processing the logic of the terminal and the server. Alternatively, the second communication module may be a module based on a mobile communication network, which may be 2G, 3G, 4G, 5G and other communication networks capable of realizing remote communication.

The terminal involved in this description can be installed in logistics container (such as recyclable logistics container). A plurality of terminals form a wireless communication network system with the server through their respective first communication module and second communication module, so as to realize the waking up of a plurality of terminals and the asset inventory work of each logistics container.

Alternatively, the terminal involved in this description can be installed in the logistics container in a detachable way, so that it can be replaced and repaired in time when the terminal fails.

Figure 2:
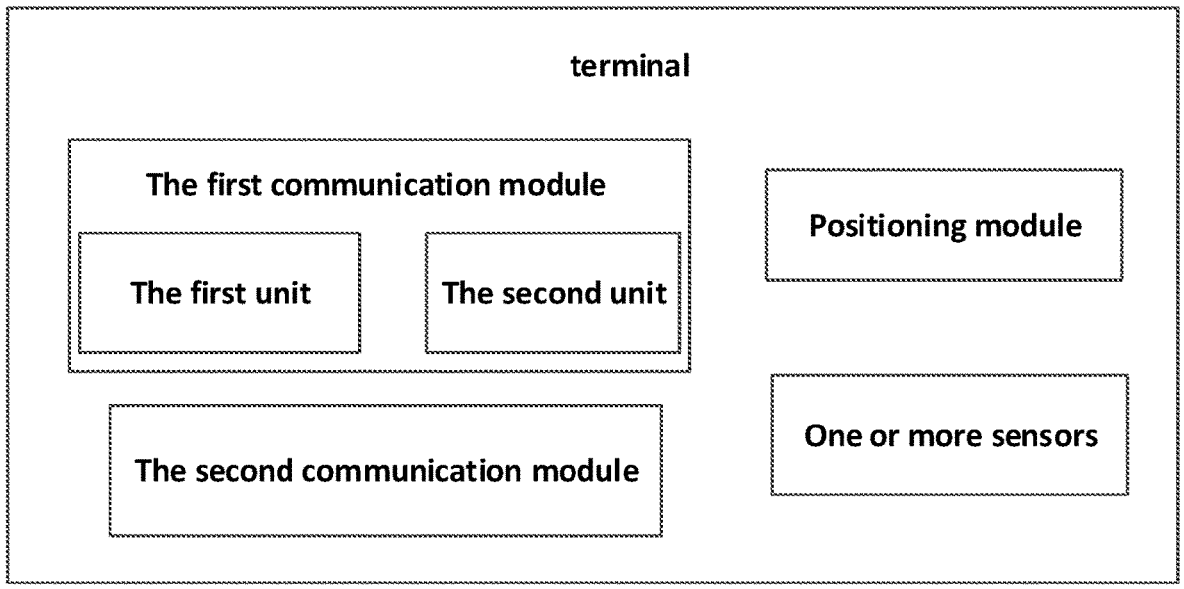
FIG. 2 is an embodiment of the structure diagram of the terminal according to the description.

FIG. 2 is an embodiment of the terminal structure diagram involved in this description.

Alternatively, the terminal involved in this description also includes a positioning module, which may be but is not limited to an RFID module for near-field communication of the terminal. Specifically, the near-field communication relies on the nearby base station for short-range communication, and the coverage of the base station is the accuracy range of positioning.

Alternatively, the RFID module may be a passive RFID module or an active RFID module, and the communication distance is less than a certain range (for example, 100 meters), so as to realize the inventory of logistics container assets and accurate position control inside and outside the field (or indoor and outdoor).

Alternatively, the terminal involved in this description is an intelligent terminal, and also includes one or more sensors for detecting the status of the recyclable logistics container.

There are many kinds of sensors. Alternatively, the sensors include temperature sensor, humidity sensor, acceleration sensor, gyroscope, satellite positioning device, switch device, etc.

The second embodiment of the application relates to a data reporting system of a logistics container. Each logistics container is provided with a terminal, and each terminal includes a first communication module and a second communication module. The communication distance of the second communication module is greater than that of the first communication module. The data reporting system of the logistics container includes at least a first terminal, a second terminal and a server.

In Detail:

The server is configured to cache the first message if the second communication module of the first terminal is in sleeping state when the server sending the first message to the second communication module of the first terminal, and send the second message to the second terminal if the server detects that the identification of the first terminal is included in the identifications of other surrounding terminals reported by the second terminal.

The first terminal is configured to communicate with the server through the second communication module of the terminal to receive the first message.

Alternatively, the first terminal is also configured to detect the energy value of the wireless signal at a preset frequency point. If the detected energy value exceeds the preset threshold, the second unit of the first terminal in sleep is waked up. The second unit is configured to receive the wireless signal within the preset time period and detect whether the preset identification code exists in the received wireless signal. If the preset identification code exists in the received wireless signal, the second communication module of the first terminal is awakened.

The second terminal is configured to report the identifications of other surrounding terminals detected by the second terminal through the first communication module of the second terminal to the server when communicating with the server through the second communication module of the second terminal, and in response to the second message, the second terminal wakes up the second communication module of the first terminal through the first communication module of the second terminal.

Alternatively, the second terminal is also configured to transmit the preset identification code at the preset frequency point through the first communication module of the second terminal.

Figure 3:
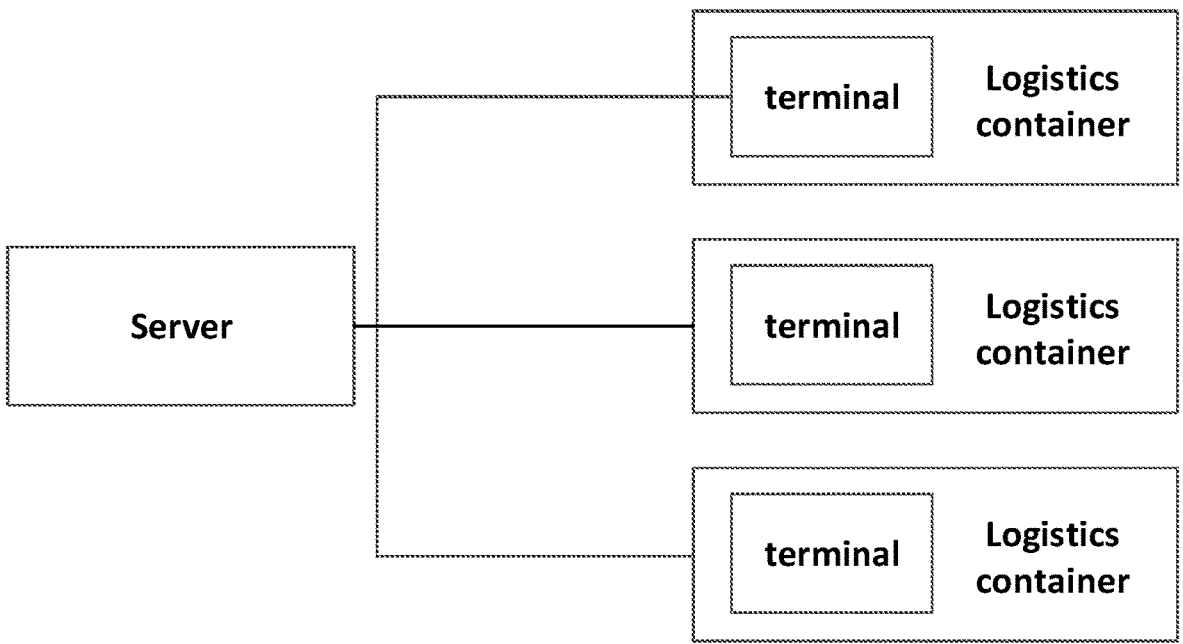
FIG. 3 is a structural diagram of a data reporting system of a logistics container according to the second embodiment of the present application

FIG. 3 is an embodiment of the data reporting system of the logistics container according to the second embodiment of the present application.

The first embodiment is a method embodiment corresponding to the present embodiment. The technical details in the first embodiment may be applied to the present embodiment, and the technical details in the present embodiment may also be applied to the first embodiment.

It should be noted that the recyclable logistics container involved in this description is a specific embodiment of the logistics container.

It should be noted that in the application document of this patent, relational terms such as first and second are only configured to distinguish one entity or operation from another, and do not necessarily require or imply any such actual relationship or order between these entities or operations. Moreover, the terms "including", "containing" or any other variation thereof are intended to cover nonexclusive inclusion, so that a process, method, article or device that includes a series of elements includes not only those elements, but also other elements that are not explicitly listed, or elements inherent in such process, method, article or device. Without more restrictions, the element defined by the sentence "including one" does not exclude the existence of other identical elements in the process, method, article or equipment including the element. In the application document of this patent, if it is mentioned that an act is performed according to an element, it means that the act is performed at least according to the element, which includes two cases: the act is performed only according to the element, and the act is performed according to the element and other elements. A plurality of, a plurality of times, a plurality of kinds, including 2, 2 times, 2 kinds and more than 2, more than 2 times, more than 2 kinds.

All documents mentioned in the present application are considered to be included in the disclosure of the present application as a whole, so as to be the basis for modification when necessary. In addition, it should be understood that the above description is only a better embodiment of the specification and is not configured to limit the protection scope of the specification. Any modification, equivalent replacement, improvement, etc. made within the spirit and principles of one or more embodiments of this specification shall be included in the protection scope of one or more embodiments of this specification.

What claimed is:

1. A data reporting method for logistics containers, wherein each logistics container comprising a terminal, each terminal comprising a first communication module and a second communication module, and a communication distance of the second communication module is greater than a communication distance of the first communication module, the method comprising:

caching a first message if the second communication module of a first terminal being in sleeping state when a server sending the first message to the second communication module of the first terminal;

reporting identifications of other surrounding terminals detected by the second terminal through the first communication module of a second terminal to the server when the second terminal communicating with the server through the second communication module of the second terminal;

sending a second message to the second terminal if the server detecting that an identification of the first terminal is included in the identifications of other surrounding terminals reported by the second terminal;

in response to the second message, the second terminal waking up the second communication module of the first terminal through the first communication module of the second terminal;

the first terminal communicating with the server through the second communication module of the first terminal to receive the first message.

2. The method of claim 1, wherein the second terminal waking up the second communication module of the first terminal through the first communication module of the second terminal, further comprising:

the second terminal transmitting a preset identification code at a preset frequency point through the first communication module of the second terminal;

the first terminal detecting an energy value of a wireless signal at the preset frequency point, and if the detected energy value exceeding a preset threshold, waking up a second unit of the first terminal in sleep, and the second unit receiving the wireless signal within a preset time period and detecting whether the preset identification code exists in the received wireless signal, and waking up the second communication module of the first terminal if the preset identification code is detected.

3. The method of claim 1, wherein the first communication module is a Sub-1 GHz module, a Bluetooth module, a ZigBee module, or a WIFI module;

the second communication module is a module based on a mobile communication network.

4. The method of claim 1, wherein the preset identification code is:

a unique identification of the terminal, wherein the unique identification of different terminals is different;

or, an identification of the user to which the terminal belongs, wherein each user owns one or more terminals.

5. The method of claim 1, wherein the terminal is installed in a recyclable logistics container, and the terminal also comprise one or more sensors for detecting the state of the recyclable logistics container.

6. The method of claim 5, wherein the sensor comprises one or any combination of the following: temperature sensor, humidity sensor, acceleration sensor, gyroscope, satellite positioning device and switching device.

7. A data reporting system for logistics containers, wherein each logistics container comprising a terminal, each terminal comprising a first communication module and a second communication module, and a communication distance of the second communication module is greater than that of the first communication module; the system comprising a first terminal, a second terminal and a server, wherein:

the server configured to cache a first message if the second communication module of the first terminal is in sleeping state when the server sending the first message to the second communication module of the first terminal, and send a second message to the second terminal if it is detected that an identification of the first terminal is included in an identifications of other surrounding terminals reported by the second terminal;

the first terminal configured to communicate with the server through the second communication module of the terminal to receive the first message;

the second terminal configured to report the identifications of other surrounding terminals detected by the second terminal through the first communication module of the second terminal to the server when communicating with the server through the second communication module of the second terminal, and responding to the second message, the second terminal waking up the second communication module of the first terminal through the first communication module of the second terminal.

8. The system of claim 7, wherein the second terminal is also configured to transmit a preset identification code at a preset frequency point through the first communication module of the second terminal;

the first terminal is also configured to detect an energy value of the wireless signal at the preset frequency point, and wake up a second unit of the first terminal if the detected energy value exceeding a preset threshold, and the second unit is configured to receive the wireless signal within a preset period of time and detect whether the preset identification code exists in a received wireless signal, and wakeup the second communication module of the first terminal if the preset identification code is detected.

9. The system of claim 8, wherein the preset identification code is:

a unique identification of the terminal, in which the unique identification of different terminals is different;

or, an identification of the user to which the terminal belongs, in which each user owns one or more terminals.

10. The system of claim 7, wherein the first communication module is a Sub-1 GHz module, a Bluetooth module, a ZigBee module, or a WIFI module;

the second communication module is a module based on a mobile communication network.

* * * * *